S. L. JOHNSON.
NUT LOCK.
APPLICATION FILED APR. 9, 1914.
1,132,352.
Patented Mar. 16, 1915.
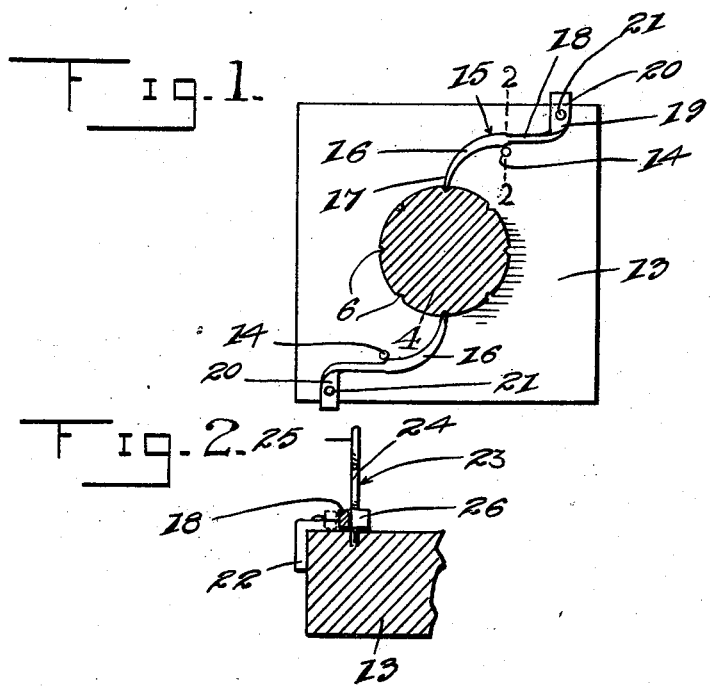
Witnesses
Inventor
S. L. Johnson.

UNITED STATES PATENT OFFICE.

SANFORD L. JOHNSON, OF SCOTLAND, GEORGIA.

NUT-LOCK.

1,132,352.    Specification of Letters Patent.    Patented Mar. 16, 1915.

Application filed April 9, 1914. Serial No. 830,764.

*To all whom it may concern:*

Be it known that I, SANFORD L. JOHNSON, a citizen of the United States, residing at Scotland, in the county of Telfair and State of Georgia, have invented certain new and useful Improvements in Nut-Locks, of which the following is a specification.

This invention relates to new and useful improvements in nut locks, and has for its principal object to provide a device which is capable of being applied to a nut of the ordinary type without materially changing the construction thereof.

Another object of the invention is to provide a nut lock which may be easily released when it is desired to remove the nut from its position on the bolt.

A further object of the invention is to provide a simple and effective nut lock which is arranged to coöperate with grooves in a bolt and which will permit the nut to be tightened and will hold the same from becoming loosened and backing off from the bolt.

With these and other objects in view the invention consists in the novel combination and arrangement of parts fully set forth in the following specification and accompanying drawings, in which, Figure 1 is a plan view of a nut lock constructed in accordance with this invention, and Fig. 2 is a detail sectional view taken on line 2—2 of Fig. 1.

Referring now to the drawings by characters of reference, the nut or body portion which is designated by the numeral 13, is provided with the recess 14, the use of which will appear as the description proceeds. The pawl which is designated generally by the numeral 15, comprises the enlarged portion 16, the free end of which is bent inwardly as at 17 and is arranged to enter the grooves 6 in the bolt 4 when the device is in use. The end of the enlarged portion 16 opposite the inturned end 17 is reduced and extended as at 18 and bent angularly as at 19 to form the portion 20 through which the rivet 21, which holds the device in place on the nut, is adapted to extend. The free terminal of the portion 20 is bent downwardly as at 22 in Fig. 2 and lies parallel to one of the sides of the nut, thus more securely holding the device in place and preventing the same from turning on the rivet 21. It will thus be seen that the pawl will be held in operative position at all times by the member 22.

The key, by means of which the pawl is released which is designated generally by the numeral 23, preferably comprises the shank 24, which terminates at its upper extremity in the ring 25 by means of which the operation of the device is controlled. The usual lug 26 is formed on the shank near the end opposite the ring and is arranged to engage the inside of the pawl to raise the same out of engagement with the shank of the bolt to permit the nut to be removed when it is so desired.

It will be apparent from the foregoing that in use the nut is placed on the bolt in the usual manner and turned to the desired position. During the turning of the nut it will also be evident that the pawl will engage the grooves 6 and rotation of the nut with relation to the bolt in the opposite direction will be prevented. Should it be desired at any time to remove the nut, the key 23 is inserted in the recess 14 and upon a slight turning of said key it will be evident that the lug 26 will engage the inside of the pawl and raise the same so that the free end thereof will be lifted from its position in the groove and the rotation of the nut will thus be permitted.

While in the foregoing there has been shown and described the preferred embodiment of this invention, it is to be understood that such changes may be made in the combination and arrangement of parts as will fall within the spirit and scope of the invention as defined in the appended claim.

Having thus described my invention, I claim:

A nut lock including the combination with a bolt having a grooved shank, of a nut having a centrally located internally screw threaded aperture, a pawl secured to the outer face of the nut, said pawl being arranged to engage in the groove in the shank of the bolt, and an angular extension at the end of the pawl opposite the one which engages the groove, said angular extension lying adjacently to one of the sides of the nut to hold the pawl against movement and positioned to engage the shank of the bolt.

In testimony whereof I affix my signature in presence of two witnesses.

SANFORD L. JOHNSON.

Witnesses:
 E. M. AULD,
 C. W. LANCASTER.

Copies of this patent may be obtained for five cents each, by addressing the "Commissioner of Patents, Washington, D. C."